United States Patent [19]

Pori

[11] Patent Number: 4,726,632
[45] Date of Patent: Feb. 23, 1988

[54] ANTI-THEFT ASSEMBLY TO FASTEN A RADIORECEIVER INTO DASHBOARDS OR THE LIKE OF MOTOR-VEHICLES

[75] Inventor: Daniele Pori, Bologna, Italy

[73] Assignee: Centro Autoradio Hi-Fi, Bologna, Italy

[21] Appl. No.: 801,861

[22] Filed: Nov. 26, 1985

[30] Foreign Application Priority Data

Dec. 18, 1984 [IT] Italy .................... 5146/84[U]
Jan. 25, 1985 [IT] Italy .................... 4734/85[U]

[51] Int. Cl.⁴ ............................................. A47B 81/06
[52] U.S. Cl. ............................... 312/71; 312/311; 312/341 NR
[58] Field of Search ............ 312/138 R, 7.1, 341 NR, 312/7.2, 311, 274

[56] References Cited

U.S. PATENT DOCUMENTS

| | | | |
|---|---|---|---|
| D. 74,971 | 4/1928 | Dunbar | 312/7.1 X |
| 1,718,374 | 6/1929 | Oberst | 312/7.1 X |
| 1,751,899 | 3/1930 | Whitfield | 312/341 NR |
| 2,486,536 | 11/1949 | Olson | 312/7.1 X |
| 2,746,824 | 5/1956 | Bond | 312/7.1 |
| 3,832,025 | 8/1974 | Artner et al. | 312/7.1 X |
| 3,888,494 | 6/1975 | Herst | 312/7.1 X |
| 4,005,367 | 1/1977 | Dano | 312/7.1 X |
| 4,346,950 | 8/1982 | Ueno et al. | 312/138 R |

FOREIGN PATENT DOCUMENTS

| | | | |
|---|---|---|---|
| 73073 | 3/1983 | European Pat. Off. | 312/7.1 |
| 0133166 | 3/1984 | European Pat. Off. | |
| 2389350 | 1/1979 | France | 312/7.1 |
| 413439 | 2/1947 | Italy | 312/7.1 |
| 3359A83 | 3/1983 | Italy | |

OTHER PUBLICATIONS

NASA Tech. Briefs, Foam-Filled Cushions for Sliding Trays, Spring 1980, p. 107, (Lyndon B. Johnson Space Center, Houston, Tex.).

Primary Examiner—Peter A. Aschenbrenner
Assistant Examiner—Thomas A. Rendos
Attorney, Agent, or Firm—Stevens, Davis, Miller & Mosher

[57] ABSTRACT

An anti-theft assembly for fastening a radio receiver in a dashboard or the like of a motor vehicle. The assembly includes a housing placed in a space in the dashboard. The housing includes a door pivoted to a wall thereof for closing a front opening in the housing. A radio receiver body is positioned in the housing and is movable between a first position and a second position within the housing. A conection assembly connects the body and the door of the housing, to close the front opening when the radio receiver body is in the first position and to open the front opening when the radio receiver body is in the second position. An electric motor is secured to the radio receiver body and has a shaft connected with the housing and includes a cam for moving the radio receiver body from the first position to the second position. The assembly also includes a control means for actuating the electric motor.

3 Claims, 7 Drawing Figures

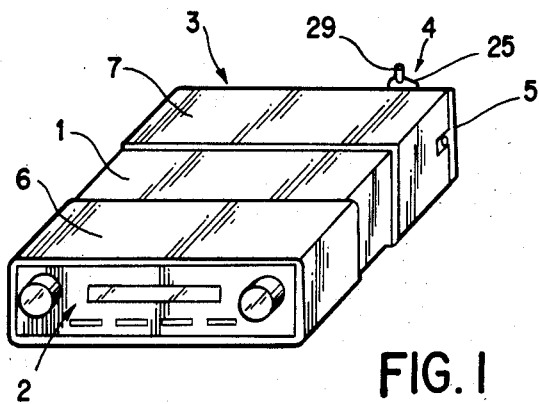
FIG. 1
FIG. 2
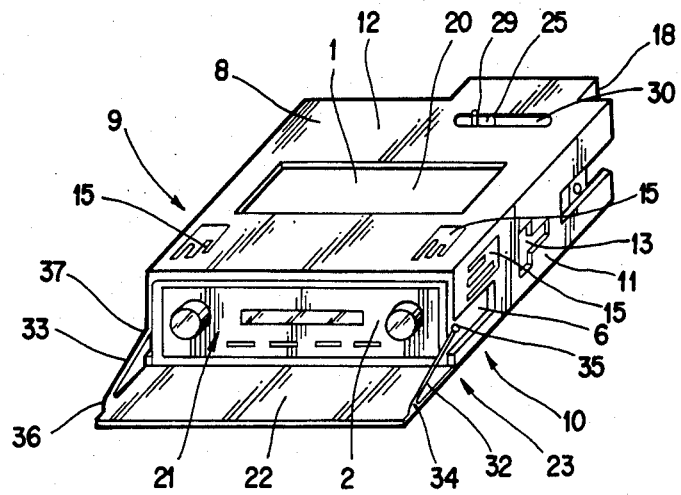

ANTI-THEFT ASSEMBLY TO FASTEN A RADIORECEIVER INTO DASHBOARDS OR THE LIKE OF MOTOR-VEHICLES

The invention relates to an anti-theft assembly to fasten a radioreceiver inside a motorvehicle; in detail it concerns an assembly controlled by an electric motor which operates by means of push buttons of microswitch controls to move forward and backward a body containing the radioreceiver inside a housing, and simultaneously to close and open the doors placed on the opening of the housing which is fastened inside the dashboard and which is made of very resistant material.

In Italian Patent Application No. 3359 A/83 filed on Mar. 9, 1983, an anti-theft assembly for radioreceivers mounted inside a motorvehicle is described as follows: a body consisting of a metallic box contains a radioreceiver and a housing contains the above body. An electric motor, integral with the housing, moves a cam, integral with a pin which slides into a slot, present in a protrusion of the body. A break-proof door is connected to the body by means of conrods to open and close a front opening of the housing. On the side walls of the housing there are some grooves which receive and guide the rolling pins pivoted on the body.

The assembly of the aforesaid Application has some disadvantages such as: the locations the electric motor and of the grooves. The location of the motor integral with the wall of the housing made the assembly not completely safe against theft. The lateral grooves needed some expensive workings about the plate forming the housing. Only one door made the mounting of the assembly on some type of motorvehicles quite difficult.

The invention, as it is characterized in the claims, solves the problem of creating an assembly for the fastening of radioreceivers inside dashboards or the like of motorvehicles, which acording to the wishes of the motorvehicle's owner and by at least one electric motor moves said radioreceiver, contained in a body wound by a prefixed number of self-lubricating bands fit to slide, together with the radioreceiver, inside a housing, contained in said dashboard, in order to allow the closing of the same housing by break-proof doors; in said assembly, said electric motor cannot be reached because of the same housing which protects it and which is integral with the body of the radioreceiver. The electric motor has a sufficiently robust frame which inhibits the unauthorized removal of the radioreceiver from the housing.

The advantages obtained due to this invention, in addition to the features presented in the Italian Application No. 3359 A/83, consist in the fact that the translations are eased by the above mentioned bands integral with the radioreceiver body, cheaply and quickly. Furthermore the use of more than one door makes the installation of the assembly possible on dashboards of motorvehicles of different sizes. Finally the assemlby is characterized by its considerably robustness.

The structure and operation of the invention together with further objects and advantages may be better understood from the following description given in connection with the enclosed drawings in which:

FIG. 1 is a perspective view of a radioreceiver with two self-lubricant bands around its body.

FIG. 2 is a perspective view of a first embodiment of a housing containing the above body with elements for hooking to a space created inside the dashboard of a motorvehicle.

Figure 5:
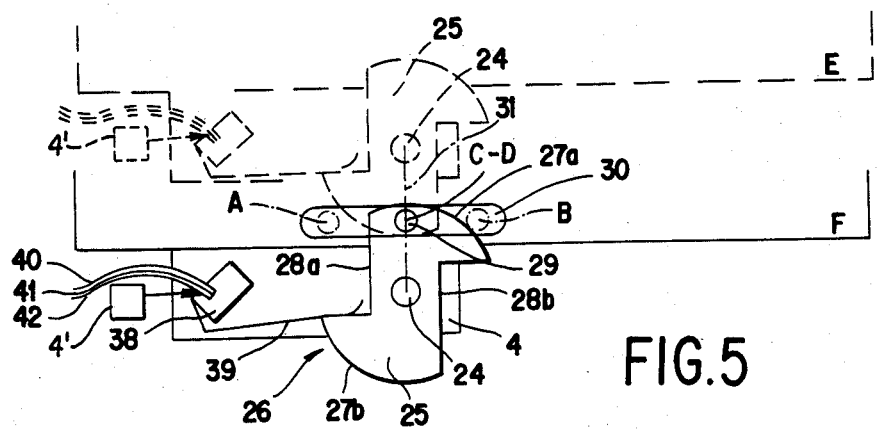

FIG. 5 schematically represents the functioning of the assembly according to the present invention.

Figure 6:
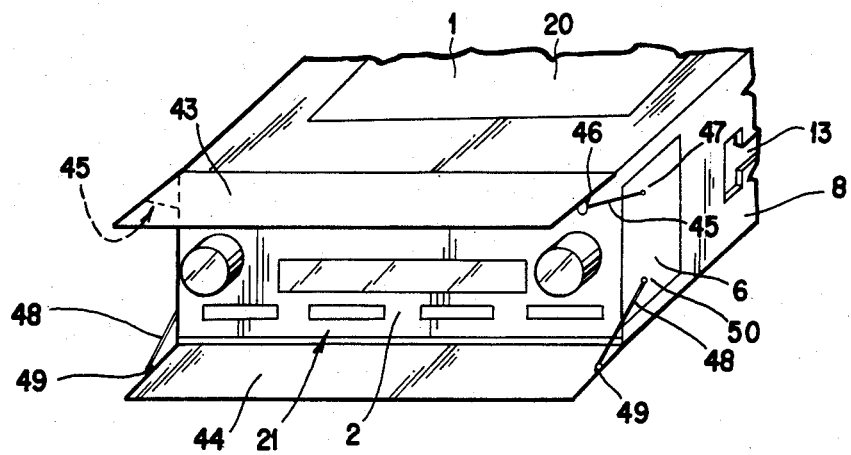

FIG. 6 is a perspective view of a second embodiment of a housing containing the above body with elements for hooking to the space created in the dashboard of a motorvehicle.

Figure 7:
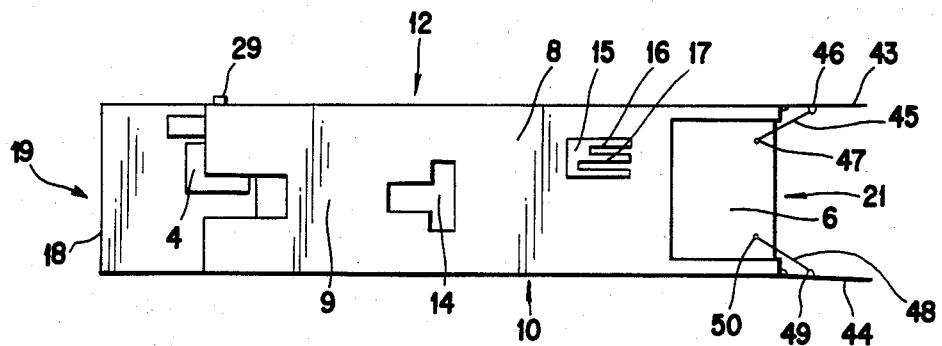

FIG. 7 is a side view of a second embodiment of a housing inside the space.

Figure 8:
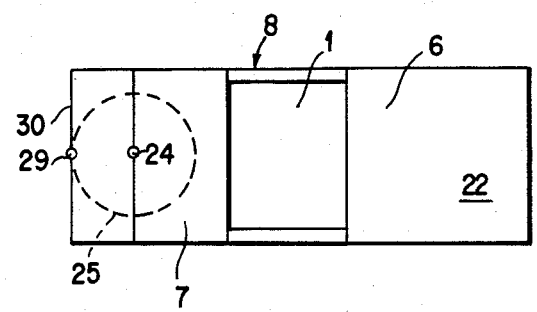
Figure 9:
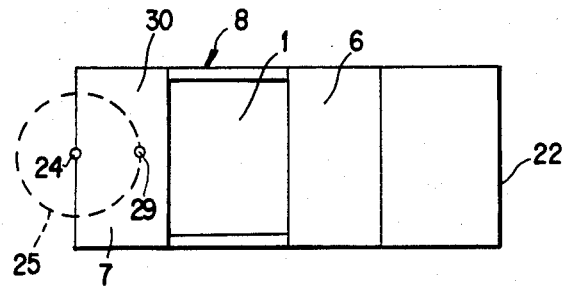

FIGS. 8 and 9 are a further schematic representation of the movement of the assembly according to the invention.

As shown in FIG. 1, a radioreceiver is housed inside a box-shaped body 1, with a front side 2, on which are located control buttons, and a back side 3, which supports an electric motor 4, held onto body 1 by means of a bracket 5. A first band 6 and a second band 7 of self-lubricating material are fixed around the side walls of the body 1; these bands respectively wind around a first front part and a second back part of the body 1.

Figure 4:
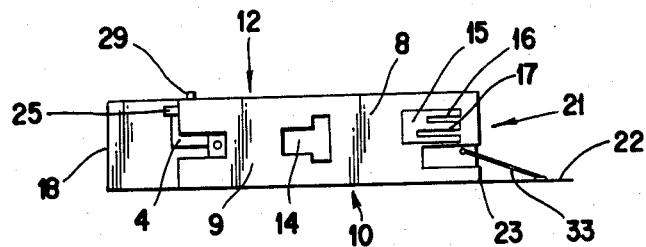
FIG. 4 is a side view of a first embodiment of a housing having an opening with elements to position the housing inside the space.

FIG. 2 shows a housing 8 suitable for being placed inside a space (not shown) e.g., in a dashboard motorvehicle (not shown). Housing 8 contains said body 1 such that the bands 6 and 7 are snugly received by the inner surfaces (not shown) of four walls 9, 10, 11 and 12 which laterally delimit said housing. The side walls 9 and 11 have, respectively, a first slot 14 and a second slot 13 (see FIG. 4) to receive the ends of the elements for hooking (which are conventional and therefore not shown) the housing 8 to the aforesaid motor vehicle space; furthermore the same walls 9 and 11 have an opening 15, better respresented in FIG. 4; each wall 10 and 12 has two identical openings 15. As best shown in FIG. 4, each opening 15 has two tangs 16 and 17, obtained by removing some material from the relevant wall; these tangs define a stopping plane relative to the edge of an opening in the wall of the sapce to receive housing 8.

Figure 3:
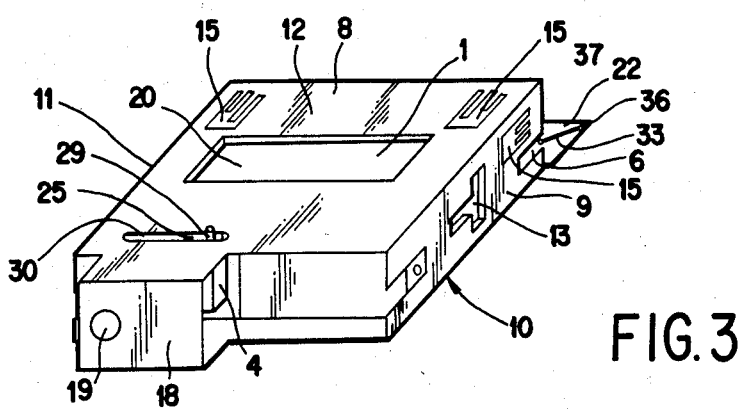
FIG. 3 is a perspective back-view of a housing according to the subject invention.

The back wall of housing 8 (FIG. 3) is usually open, but it holds a U-shaped frame 18 integral with housing 8 by means of weld bead or spots (not shown). Said frame 18 is provided to protect the electric motor 4 and the mechanical elements connected to it and to receive in a hole 19 a screw-like locking element (not shown) of the housing 8. The upper wall 12 has an opening 20 in order to allow body 1 to cool when the radioreceiver is working; a similar opening is in the lower wall 10.

Housing 8 has a front opening 21 to distinguish the front wall 2 of the body 1. Opening 21 may be closed by a door 22 hinged on an end 23 of the wall 10 of housing 8. With reference to FIG. 5, the electric motor 4 placed into the U-shaped frame 18 has a little shaft 24 angularly integral with a cam 25 with a contour 26 provided with two round parts 27a and 27b, exactly alike each other, and two notches 28a and 28b which are also exactly alike.

The part 27a integrally supports a pin 29 which is snugly received by a slot 30 in housing 8 and which slides in slot 30 back and forth between a first position A and second position B when the shaft 24 rotates; while it slides, the pin 29 comes to be in a third position C and in a fourth coincident position D, called, respectively, as top dead center and bottom dead center of a crank gear in which the pin 29 works as conrod pin of a crank 31 geometrically represented by a segment which connects the shaft 24 and the pin 29 sliding in the slot 30 in housing 8. For this reason, when the pin 29 is in the position C, the body 1 is in a fifth position within plane E, forward with respect to the housing 8, and when the pin 29 is in the position D, the body 1 is in a sixth position within plane F backward with respect to the housing 8. This movement of the body 1 becomes possible because the electric motor 4 is integral with it. In order to obtain, respectively, the opening and the closing of the door 22, when the body 1 is in the first position within plane E and in the second position F, two little conrods 32 and 33 connect the door 22 to the band 6. The little conrod 32 moves between two pins 34 and 35 supported, respectively, by the door 22 and the band 6; the little conrod 33 moves between two pins 36 and 37, supported, respectively, by the door 22 and the band 6.

In order to stop the translations of the body 1 from the position within plane E to the position within plane F, and vice versa, there is a microswitch 38 (FIG. 5) with a lever 39 and three reophores 40, 41 and 42 which connect the microswitch 38 to the electric motor 4 and to a control push button panel (not shown) including pushbutton 4' at the driver's disposal and which is possible to lock when the key of the vehicle is disconnected.

The microswitch 38 is integral with the body for maintaining a constant distance from the electric motor 4 when the assembly is working; therefore its lever 39 always remains in touch with the contour 26 of the cam 25. When one of the two nothes 28a or 28b operates on the lever 39 of the microswitch 38, the electric circuit which feeds the motor 4 is disconnected and therefore the movement of the shaft 24 ceases. In order that these disconnections happen when the body is in a position within plane or in a position within plane E, notches 28a and 28b must be positioned as shown in FIG. 5, i.e. they have to operate on the lever 39 when the body 1 is in position E or in position F.

FIGS. 8 and 9 show a fruther schematic representation of the movement of body 1 relative to housing 8 consistent with the respresentation in FIG. 5. FIG. 8 shows door 22 open and body 1 positioned at its forward position within housing 8. FIG. 9 shows door 22 closed and body 1 positioned at its rearward position within housing 8. Cam 25 is shown in dashed lines to illustrate its outer extent and is rotatably movable via shaft 24. Pin 29 on cam 25 is fitted within elongated slot 30 in housing 8. Cam 25 is secured to body 1. As a result, as cam 25 rotates, pin 20 engaging slot 30 causes the center of cam 25 (i.e., at shaft 24) to move rectilinearly between its extreme positions shown respectively in FIGS. 8 and 9. This is turn causes body 1 to slide within housing 8 to its extreme positions.

The embodiment of the invention shown in FIGS. 6 and 7 differs from that shown in FIGS. 1 and 4 only in that the front opening 21 of the housing 8 is closed by means of two doors 43 and 44, respectively upper and lower doors. Between the upper door 43 and band 6 there is a little conrod 45 pivoted on two pins 46 and 47, respectively, integral with the door 43 and the band 6.

Between the lower door 44 and the band 6 there is a little conrod 48 on two pins 49 and 50, respectively, integral with the door 44 and the band 6.

It is noted that, even in this case, when the body 1 is in the position within plane E, the doors 43 and 44 are open and when the body 1 is in the position within plane F, the doors 43 and 44 are closed.

The embodiments shown and described may be modified, particular in regard to the bands which wind around the entirety of body 1.

These bands may become a structure of self-lubricant material which completely winds around the body 1. Also, it is possible to obtain a translation of the body 1, even if the bands are fixed with respect to the housing. In this case a further embodiment is provided in which the housing 8 supports two bands placed on two opposite walls.

I claim:

1. An anti-theft assembly for fastening a radio receiver in a dashboard of a motor vehicle to prevent removal therefrom, the dashboard including a space having a wall with an opening therein, said assembly comprising:
   (a) a housing adapted to be placed in the space in the dashboard, said housing including a front opening;
   (b) said housing including a door pivoted to a wall of said housing for closing said front opening;
   (c) a radio receiver body positioned in said housing, said body having a top, bottom and opposite side members, said body being movable between a first position and a second position within said housing, said body including a self lubricating structure for guiding said body between said first position and said second position,
   said self lubricating structure comprising at least one continuous band extending around said top, bottom and side members of said body;
   (d) a connection means connecting said body and said door, for closing said front opening when said body is in said first position and for opening said front opening when said body is in said second position;
   (e) an electric motor secured to said body and having a shaft connected with said housing and for moving said body between said first position and said second position;
   (f) stopping means cooperating with said electric motor, for stopping movement of said body at said first position and said second position; and
   (g) control means connected to said motor for actuating said motor.

2. An assembly as in claim 1, wherein said motor includes a cam integral with said shaft and said housing includes a slot, said cam including a pin inserted in said slot to move within said slot.

3. An assembly as in claim 2, wherein said stopping means comprises an electric drive system for said motor, said electric drive system comprising a microswitch means cooperating with said cam for stopping movement of said body in said first position and said second position and said control means comprising a pushbutton for actuating said motor.

* * * * *